United States Patent [19]
Queen

[11] Patent Number: 5,739,477
[45] Date of Patent: Apr. 14, 1998

[54] PORTABLE APPARATUS FOR MONITORING THE WEIGHT OF A VEHICLE

[76] Inventor: C. Ray Queen, P.O. Box 301, Broken Bow, Okla. 74728

[21] Appl. No.: 371,942

[22] Filed: Jan. 12, 1995

[51] Int. Cl.$^6$ .................. G01G 21/00; G01G 19/08; B62D 21/14
[52] U.S. Cl. .................. 177/126; 177/136; 280/43.11; 280/43.24; 414/484
[58] Field of Search .................. 414/484, 485; 280/43, 47, 43.11, 43.24, 767, 475; 177/132, 133, 134, 136, 137, 138, 139, 141, 126

[56] References Cited

U.S. PATENT DOCUMENTS

| | | | |
|---|---|---|---|
| 2,174,415 | 9/1939 | Curtis | 414/484 |
| 2,513,855 | 7/1950 | Fogwell | 280/767 |
| 2,776,133 | 1/1957 | Bates | 177/126 |
| 2,867,444 | 1/1959 | Henning et al. | 414/484 |
| 2,869,855 | 1/1959 | Murphy | 177/126 |
| 3,135,401 | 6/1964 | Schramm | 177/136 |
| 3,164,218 | 1/1965 | McClimon | 177/132 |
| 4,969,112 | 11/1990 | Castle | 177/136 X |
| 4,979,581 | 12/1990 | Kroll | 177/134 X |
| 5,360,308 | 11/1994 | Hansen | 414/363 |

*Primary Examiner*—Michael L. Gellner
*Assistant Examiner*—Randy W. Gibson
*Attorney, Agent, or Firm*—Dunlap & Codding, P.C.

[57] ABSTRACT

An apparatus and method for weighing a vehicle on a ground support surface comprising a scale platform adapted to support the vehicle and a scale positioned on the scale platform operably engagable with the vehicle to monitor the weight of the vehicle. The platform having a lower side defining a ground contact surface engagable with the ground support surface. The ground contact surface having an area sufficient to support the platform and the vehicle on the ground support surface so as to prevent the platform from sinking substantially into the ground support surface. The platform is rollingly supportable on a plurality of wheels.

8 Claims, 7 Drawing Sheets

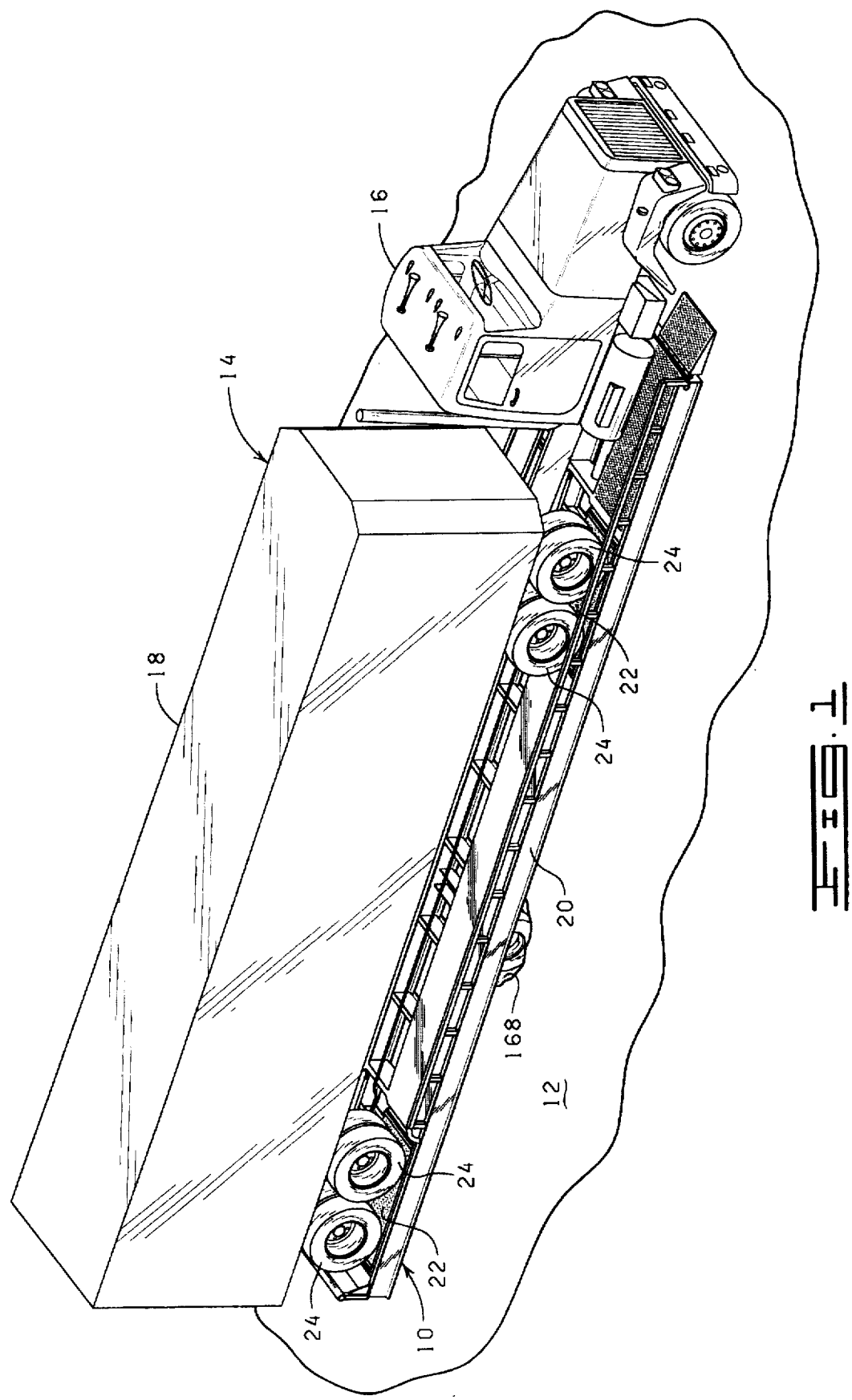

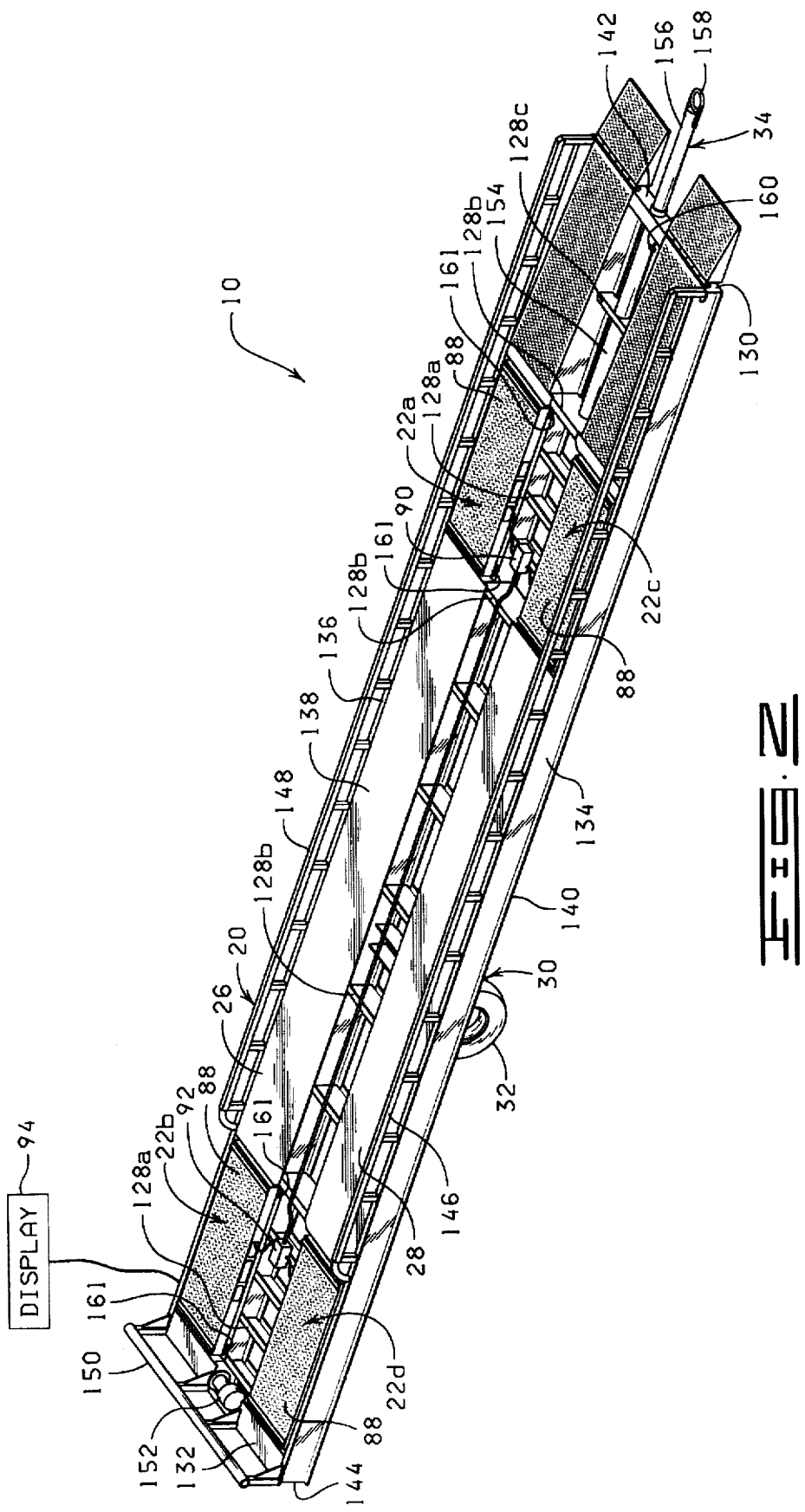

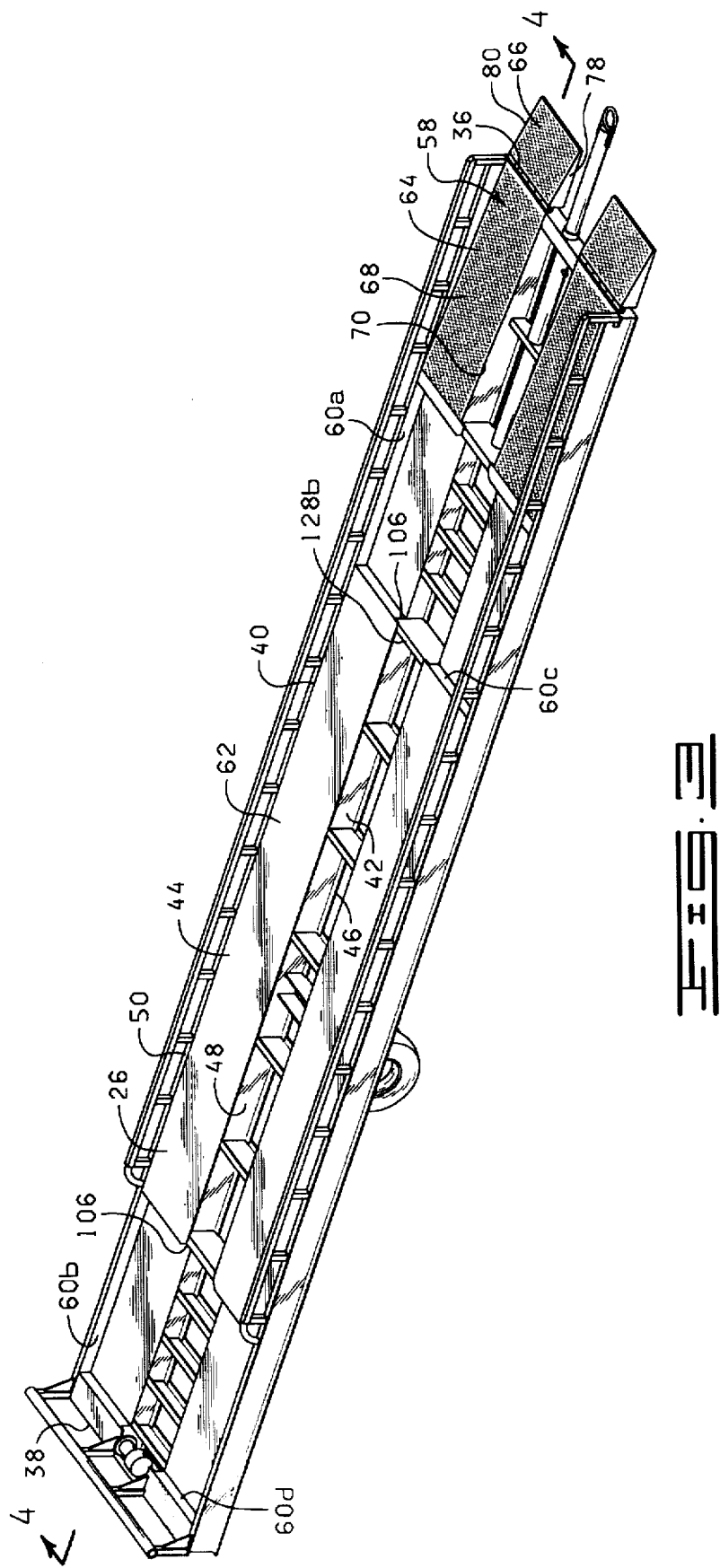

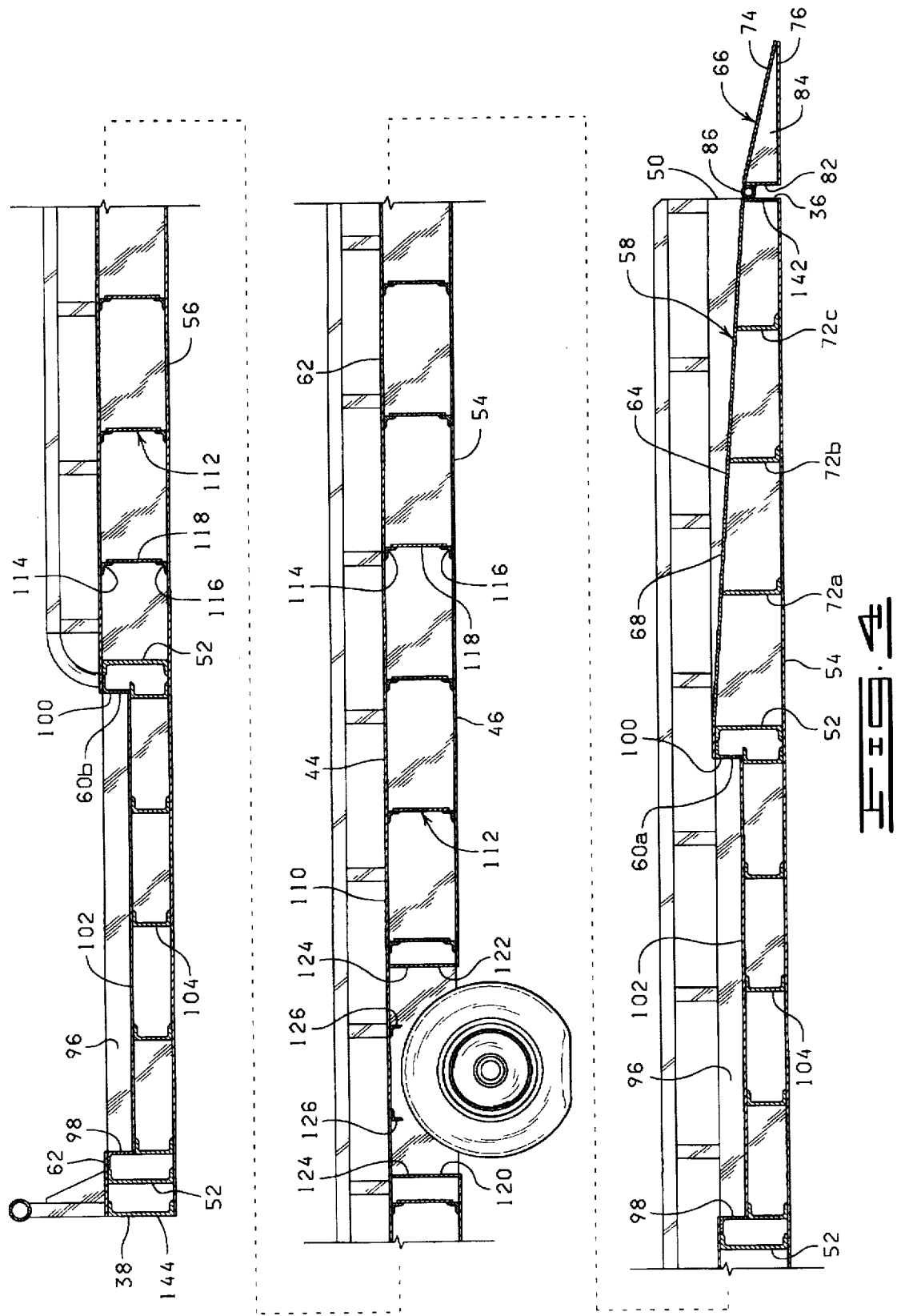

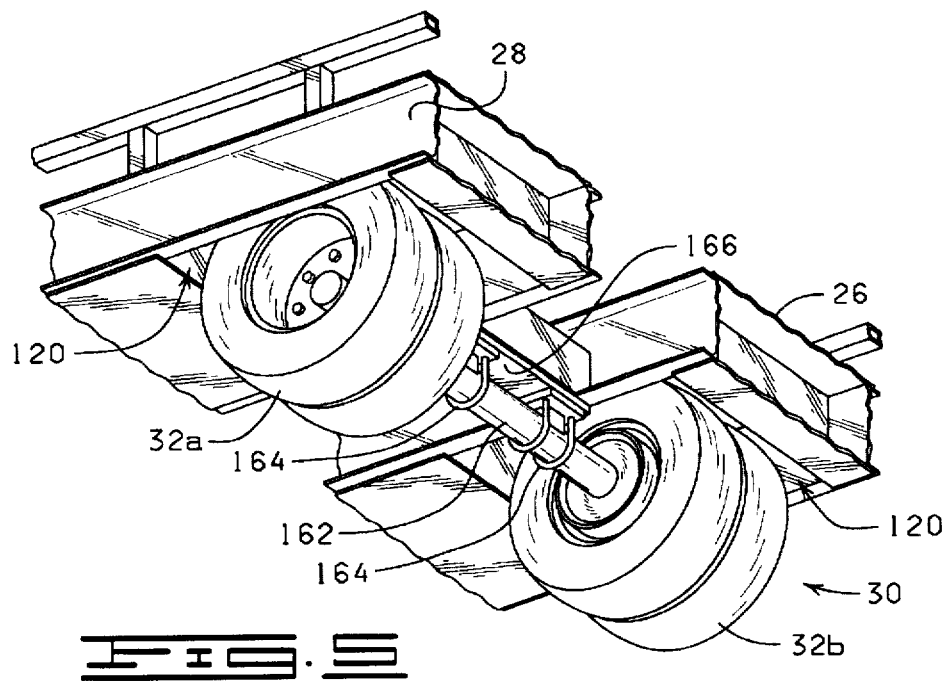

FIG. 5

| Transport weighing apparatus to select location. |
|---|
| Setting the platform on the ground support surface to remove load from wheels. |
| Position the vehicle on the scale pads. |
| Load vehicle with cargo. |
| Monitor the weight of the vehicle and the cargo. |
| Discontinue loading when a predetermined amount of cargo has been loaded. |
| Transport the vehicle to a predetermined destination. |

FIG. 6

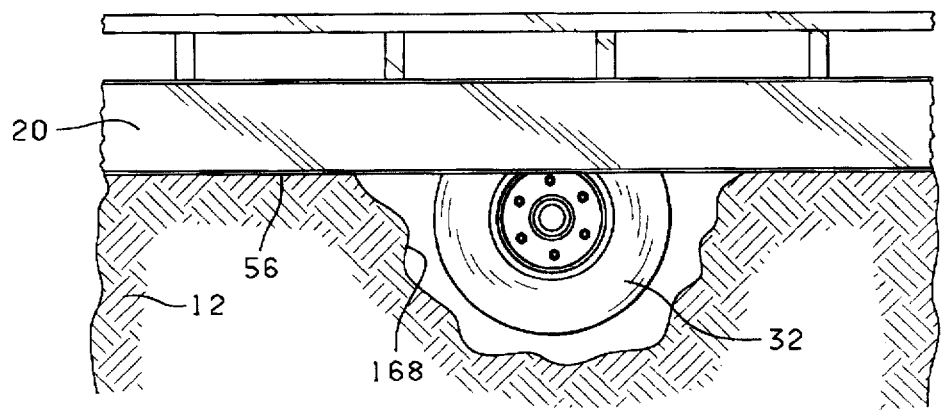
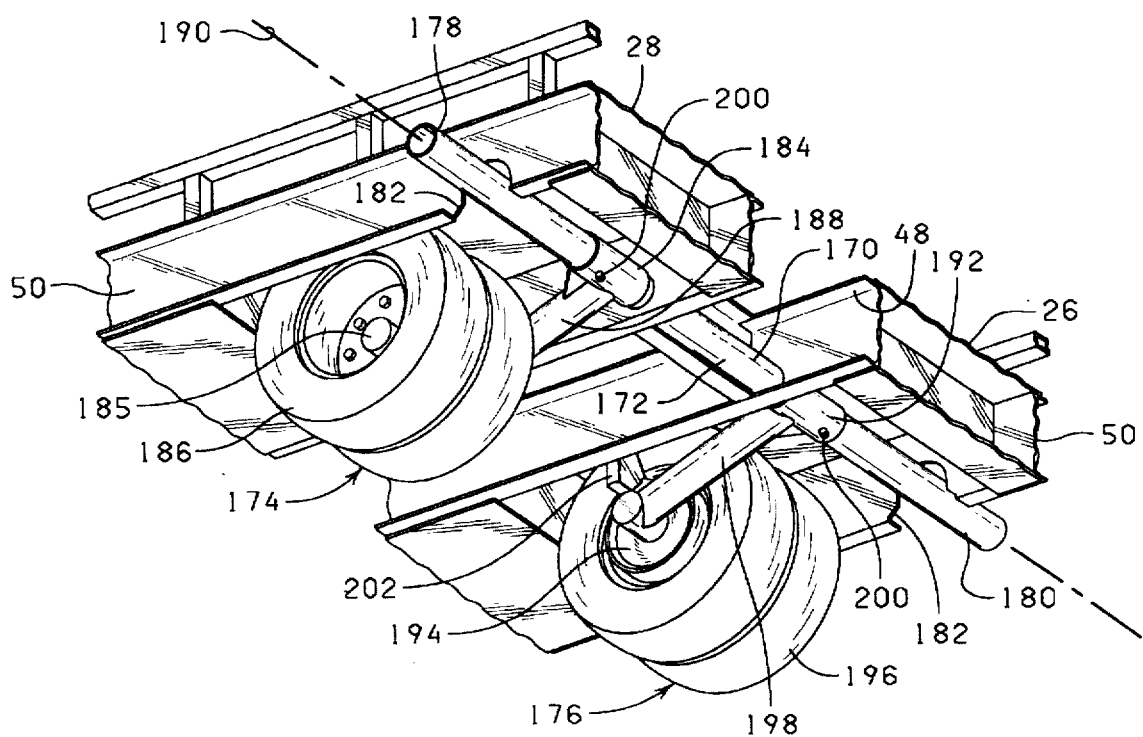
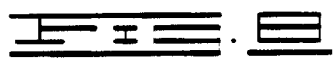

5,739,477

1

PORTABLE APPARATUS FOR MONITORING THE WEIGHT OF A VEHICLE

BACKGROUND OF THE INVENTION

1. Field of the Invention

This invention relates generally to weighing devices, and more particularly, but not by way of limitation, to a portable platform adapted to support a scale for weighing vehicular loads at remote locations and to a method of using same.

2. Description of Related Art

The amount of weight vehicles are allowed to carry is regulated in order to prevent damage to roads and highways. Exceeding the imposed weight restrictions can lead to the issuance of substantial fines against violators. To remain cost efficient and thus competitive, it is usually desirable for a hauler to carry the maximum load permitted without exceeding the imposed weight limitations. In order to accomplish this in an efficient manner, it is preferable that the weight of the vehicle be monitored continuously as the truck is being loaded. By continuously monitoring the weight of the vehicle, it is immediately known when the vehicle is loaded to the maximum permitted weight without having to load the vehicle, weigh the vehicle, and then remove a portion of the load if the weight exceeds the weight restrictions.

The usual manner of determining the amount of weight a vehicle is carrying is to drive the vehicle across a set of scales. However, when loading a vehicle in a remote location such scales are typically not available, or if they are, they are rendered inoperable due to the lack of support provided by the unreinforced ground. That is, a vehicle loaded to its maximum permitted load, which in some instances may be nearly 80,000 pounds, is likely to bury the scales into the relatively soft ground when positioned thereon, particularly in wet and muddy conditions.

Another option available for weighing the load of a vehicle is to incorporate scales on the vehicle itself. However, problems have been encountered with such scales, particularly when used in muddy areas where the mud can cause the scales to read inaccurately.

To this end, a need has long existed for a portable device which can be positioned at a remote location for supporting a set of scales for continuously monitoring the weight of a vehicle. It is to such a device that the present invention is directed.

BRIEF DESCRIPTION OF THE DRAWINGS

FIG. 1 is a perspective view of a portable vehicle weighing apparatus constructed in accordance with the present invention showing the weighing apparatus positioned on a ground support surface and a vehicle positioned on the weighing apparatus.

FIg. 2 is a perspective view of the portable vehicle weighing apparatus of FIG. 1.

FIG. 3 is a perspective view of a scale platform.

FIG. 4 a cross-sectional view of the scale platform taken at 4—4 in FIG. 3.

FIG. 5 is a perspective view of the lower side of the platform showing an axle assembly.

FIG. 6 is a block diagram of the method used in the present invention.

FIG. 7 is a side elevational view showing the wheels of the axle assembly of FIG. 5 suspended in a trench provided in a ground support surface.

FIG. 8 is a perspective view of the lower side of the platform showing another embodiment of an axle assembly.

2

Figure 9:
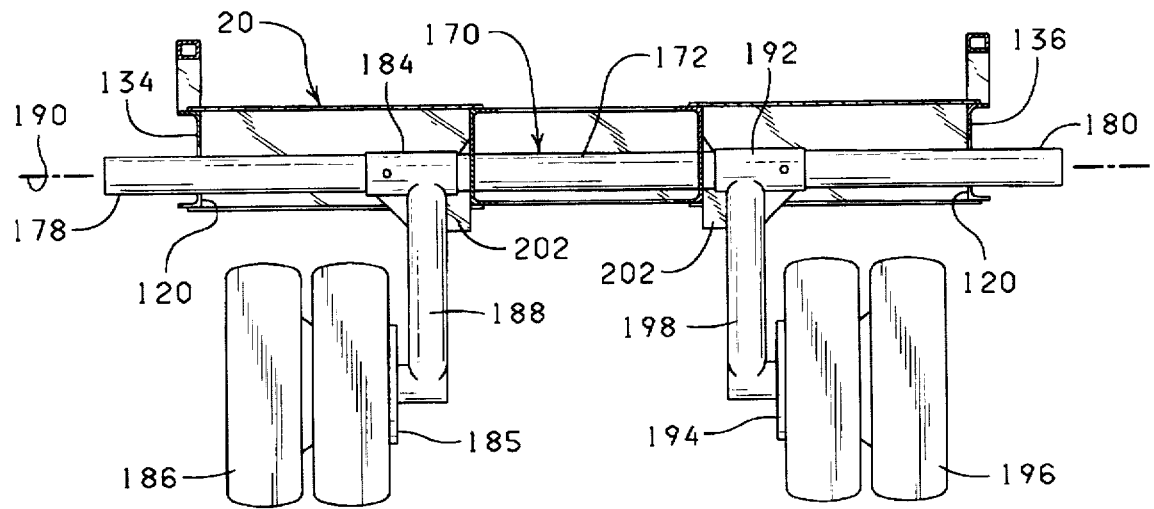

FIG. 9 is a cross-sectional, front view of the platform of FIG. 8 showing the wheels in a downward position.

Figure 10:
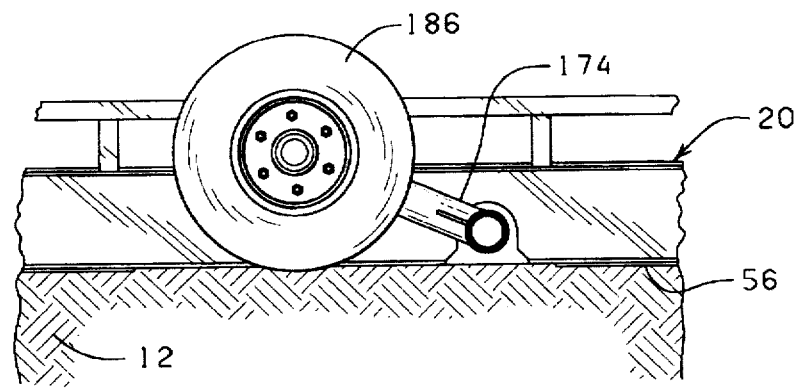

FIG. 10 is a side elevational view showing the wheels of the axle assembly of FIG. 8 in a nonload bearing position.

DETAILED DESCRIPTION

Referring now to the drawings, and more particularly to FIG. 1, a portable vehicle weighing apparatus 10 (referred to hereinafter as the weighing apparatus 10) constructed in accordance with the present invention is shown resting on a ground support surface 12 with a vehicle 14, illustrated herein as being a truck consisting of a tractor 16 and a van 18, positioned on the weighing apparatus 10. The weighing apparatus 10 is particularly useful in the logging industry where the hauling of heavy loads from remote locations is common. In one logging process for example, trees are cut, brought to a central job site, and then debarked and chipped for the purpose of making paper. After the trees are chipped, the chips are blown into a vehicle such as that shown in FIG. 1. Once the vehicle 14 has been loaded to a predetermined weight, the wood chips are transported to a paper mill for processing. The present invention allows the weight of the vehicle 14 to be continuously monitored at the job site, thus ensuring that, before departing, the load does not exceed legally prescribed weight limitations.

As shown in FIGS. 1 and 2 the weighing apparatus 10 includes a scale platform 20 and a scale comprising a plurality of scale pads 22a–22d disposed on the scale platform 20 such that the weight of the vehicle 14 can be monitored when the tires or wheels 24 of the vehicle 14 are positioned on the scale pads 22a–22d, respectively. The scale platform 20 is adapted to hold the scale pads 22a–22d and to support the vehicle 14 on the ground support surface 12. A problem experienced at job sites at remote locations such as encountered in the logging industry is that the ground support surface 12 is not typically reinforced and therefore can be relatively soft, particularly in wet conditions. As such, prior art devices for weighing a vehicle loaded with cargo may have a tendency to sink into the ground support surface and get stuck thereby rendering the device inoperable. The scale platform 20 provides a mobile structure which can be easily moved from site to site, while at the same time providing a solid structure to support the vehicle and its cargo so as to prevent the scale platform 20 from sinking substantially into the ground support surface 12 when the vehicle is disposed on the weighing apparatus 10.

As best shown in FIG. 2, the scale platform 20 comprises a first platform portion 26 and a second platform portion 28 connected to one another in a spaced apart, parallel relationship; an axle assembly 30 which includes a plurality of wheels 32 for rollingly supporting the scale platform 20; and a hitch assembly 34 which permits the scale platform 20 to be connected to a towing vehicle (not shown) so that the scale platform 20 can be selectively transported.

The first and second platform portions 26, 28 are essentially identical in construction with the second platform portion 28 being a mirror image of the first platform portion 26. Thus, only the first platform portion 26 will be described in detail below.

Referring now to FIGS. 3 and 4, the first platform portion 26 is characterized as having a first end 36, a second end 38, an outer side 40, an inner side 42, an upper side 44, and a lower side 46. The outer side 40 and the inner side 42 are defined by a pair of longitudinal support members 48, 50, respectively, fixed in a parallel spaced apart fashion by a plurality of cross members 52 (FIG. 4) extending between the longitudinal support members 48, 50. The longitudinal support members 48, 50 extend substantially the length of the platform and are fixed apart a distance suitable to accommodate the wheel or wheels 24 on one side of the vehicle 14 and the width of the scale pads 22a–22b as will be further discussed below. The longitudinal support members 48, 50 and the cross members 52 can be constructed of any strong, durable material such as steel channel as shown herein.

While the vehicle 14 is illustrated herein as a tractor trailer, it will be appreciated by those skilled in the art that the length of the scale platform 20 will be varied according to the dimensions of vehicle being weighed and the number of axles to be weighed. For example, the vehicle 14 is a tractor trailer having five axles. Because weight carried on the front axle is substantially constant, the length of the scale platform 20 need only be sufficient to accommodate and weigh the rear four axles rather than all five axles. In this instance, the scale platform 20 will require a length of approximately 50 feet. If it is desired to weigh all five axles, the length of the platform will need to be approximately 60 feet. By weighing four axles rather than five, the cost of the scale platform 20 is reduced.

To provide a solid support base for the scale platform 20, a plate member 54 (FIG. 4) is secured across the longitudinal support members 48, 50 on the lower side 46 of the first platform portion 26 so as to define a ground contact surface 56. As will be described in further detail below, in use the scale platform 20 is set on the ground support surface 12 such that the ground contact surface 56 of the scale platform 20 engages the ground support surface 12. The ground contact surface 56 provides a surface area sufficient to support the scale platform 20 and the vehicle 14 on the ground support surface 12 so as to prevent the scale platform 20 from sinking substantially into the ground support surface 12 when the vehicle 14 is positioned on the weighing apparatus 10.

The upper side 44 of the first platform portion 26 includes a ramp assembly 58, a pair of scale receiving recesses 60a, 60b formed on the upper side 44, and a platform floor 62 extending between the scale receiving recesses 60a, 60b.

The ramp assembly 58 comprises a ramp portion 64 and a hinged ramp member 66 which cooperate to facilitate positioning the vehicle 12 onto the scale platform 20. The ramp portion 64 includes an angularly disposed plate member 68 extending from the cross member 52 to the first end 36 of the first platform portion 26 and connected to each of the longitudinal support members 48, 50. The longitudinal support member 48 is shaped to provide an angled support surface 70 (FIG. 3) so that the longitudinal support member 48 does not extend above the angularly disposed plate member 68 and obstruct the vehicle 12.

The angularly disposed plate member 68 is further supported by a plurality of support members 72a, 72b, and 72c extending between the longitudinal support members 48, 50 and secured to the plate member 54 and the angularly disposed plate member 68. As shown, each subsequent support member 72a, 72b and 72c has a decreased height relative to the previous support member thereby enabling the support members 72a, 72b, and 72c to support the angularly disposed plate member 68. The support members 72a, 72b, 72c can be any material suitable for providing support, such as angle iron as shown herein.

The ramp member 66 is wedge-shaped and comprises an angular surface 74, a bottom portion 76, a first side 78 (FIG. 3), a second side 80 (FIG. 3), and a back portion 82. The angular surface 74 is reinforced with a plurality of wedge-shaped support members 84 having an identical configuration to the first and second sides 78, 80 (only one of the wedge-shaped support members 84 being shown in FIG. 4). The wedge-shaped support members 84 are fixed in the interior of the ramp member 66 spaced apart an equal distance and parallel to the first and second sides 78, 80. The ramp member 66 is connected to the first end 36 of the first platform portion 26 with a hinge connection 86 such that the ramp member 66 is pivotally connected to the first end 36 of the first platform portion 26. The ramp member 66 is movable between a raised position wherein the scale platform 20 can be transported and a lowered position wherein the bottom 76 of the ramp member 66 engages the ground support surface 12 and the angular surface 74 of the ramp member 66 is in substantial alignment with the angularly disposed plate member 68 of the ramp portion 64 such that the ramp member 66 cooperates with the ramp portion 64 so as to facilitate positioning the vehicle 12 onto the scale platform 20.

The platform floor 62 can be extended the length of the first platform portion 26 with the scale pads 22a and 22b provided with a ramp (not shown) on each end and merely disposed on the platform floor 62. However, it is preferable to dispose the scale pads 22a, 22b in the scale receiving recesses 60a, 60b, respectively. The scale receiving recesses 60a, 60b are formed in the upper side 44 of the first platform portion 26 and dimensioned to receive one of the scale pads 22a and 22b such that an upper side 88 of the scale pads 22a and 22b is substantially level with the platform floor 62 of the first platform portion 26 when the scale pads 22a and 22b are positioned in the scale receiving recesses 60a and 60b, respectively.

The scale pads 22a–22d, illustrated in FIG. 2, are conventional 7 ft.×2.5 ft. scale pads, such as manufactured by Cardinal Scales, 203 E. Daugherty, Webb City, MI 64870. Each of the scale pads 22 produces a force signal indicative of a portion of the weight of the vehicle. The force signal from the scale pads 22a and 22c is outputted to a first converter 90 which produces a combined force signal which is in turn outputted to a second converter 92. The second converter 92 receives the combined force signal from the first converter 90 and force signals from each of the scale pads 22b and 22d. The second converter 92, in turn, outputs a total weight signal to a display 94 which can be continuously monitored by an individual.

The scale receiving recesses 60a and 60b are formed a distance apart so that the scale pads 22a, 22b on the first platform portion 26 are positioned to accommodate the tires 24 on the left side of the four rearward axles of the vehicle 14 when the scale pads 22a and 22b are disposed in the scale receiving recesses 60a and 60b, respectively. Likewise, the scale receiving recesses 60c and 60d of the second platform portion 28 are formed a distance apart so that the scale pads 22c and 22d on the second platform portion 28 are positioned to accommodate the tires 24 on the right side of the four rearward axles of the vehicle 14 when the scale pads 22c and 22d are disposed in the scale receiving recesses 60c and 60d, respectively, as illustrated in FIG. 1.

Each of the scale receiving recesses 60a and 60b are defined by a portion 96 (FIG. 4) of the longitudinal support member 50, a pair of angle support members 98, 100, and a plate member 102. The angle support members 98, 100 are each connected between the longitudinal support member 48, 50 such that a portion of the angle support members 98, 100 extends downwardly to form a pair of opposing sidewalls. It will be appreciated that the dimensions of the angle support members 98, 100 will vary according to the height of the scale pads 22 utilized.

The plate member 102 is secured to the ends of the angle support members 98, 100 as shown in FIG. 4, and supported by a plurality of support members 104 dimensioned to support the plate member 102 a distance below the platform floor 62 so that the upper side 88 of the scale pads 22a and 22b is substantially level with the platform floor 62 when the scale pads 22a and 22b are positioned in the scale receiving recess 60a and 60b, respectively. The longitudinal support member 48 which defines the inner side 42 of the first platform portion 26 is provided with a pair of notches 106 (FIG. 3) to allow access to the scale pads 22a and 22b.

The platform floor 62 of the first platform portion 26 is formed by securing a plate member 110 across the longitudinal support members 48, 50 and between the scale receiving recesses 60a and 60b such that the plate member 110 is supported by the longitudinal support members 48, 50, the angle support member 100 of scale receiving recess 60b and the angle support member 98 of the scale receiving recess 60a and the cross members 52.

The plate member 110 is reinforced with a plurality of support assemblies 112. The support assemblies 112 include an upper cross member 114 extending between the longitudinal support members 48, 50 near the upper side 44 of the first platform portion 26, a lower cross member 116 secured to the longitudinal support member 48, 50 near the lower side 46 of the first platform portion 26, and a flat bar member 118 having one end connected to the upper cross member 114 and another end connected to the lower cross member 116 thereby connecting the upper cross member 114 to the lower cross member 116. The support assemblies 112 are spaced a suitable distance apart, such as 2 feet, with the flat bar member 118 preferably being centered between the longitudinal support members 48, 50.

As shown, the platform floor 62 also includes a portion extending from the scale receiving recess 60b to the second end 38 of the first platform portion 26.

A wheel well 120 is formed along a portion of the lower side 46 of the first platform portion 26 by forming an opening 122 in the ground contact surface 56. The wheel well 120 is further defined by a pair of plate members 124 extending between the floor portion 62 and the plate member 54, substantially as shown in FIG. 4. The plate members 124 are provided to prevent dirt, mud and other debris from getting into the interior of the first platform portion 26. To brace that portion of the floor portion 62 extending above the wheel well 120, a plurality of cross members 126 are extended between the longitudinal support members 48, 50 near the upper side 44 of the first platform portion 26.

Referring again to FIG. 2, the first platform portion 26 is connected to the second platform portion 28 in a spaced apart, parallel relationship with a plurality of cross members 128a, 128b, and 128c, each having one end connected to the inner side 42 of the first platform portion 26 and another end connected to the inner side 42 of the second platform portion 28. More specifically, the cross members 128a are dimensioned to be connected adjacent the scale receiving recesses 60a and 60b, the cross members 128b are dimensioned to be connected adjacent the floor portion 62, and the cross member 128c is dimensioned to be connected adjacent the ramp portion 64. The first platform portion 26 and the second platform portion 28 are spaced apart a distance sufficient to accommodate the wheel base of the vehicle 14. With the first and second platform portions 26, 28 connected together, the scale platform 20 is characterized as having a first end 130, a second end 132, a first side 134, a second side 136, an upper side 138, and a lower side 140.

The first and second platform portions 26 and 28 are further secured with an end member 142 extending the width of the scale platform 20 along the first end 130 thereof and an end member 144 extending the width of the scale platform 20 along the second end 132 thereof.

To help guide the vehicle 14 onto the scale platform 20, the scale platform 20 is provided with a first guide rail 146 positioned on the first side 134 of the scale platform 20 and extending above the upper side 138 of the scale platform 20, and a second guide rail 148 positioned on the second side 136 of the scale platform 20 parallel to the first guide rail 146 and extending above the upper side 138 of the scale platform 20. The scale platform 20 is further provided with an end guard rail 150 positioned on the second end 132 of the scale platform 20 and extending above the upper side 138 of the scale platform 20 to prevent the vehicle 14 from being backed off of the scale platform 20 and into equipment positioned adjacent the weighing apparatus 10.

To aid in positioning the vehicle 14 on the scale platform 20 in wet and slick conditions, the scale platform 20 is provided with a winch 152 on the second end 132 of the scale platform 20. The winch 152 can be utilized to pull the vehicle 14 up the ramp assembly 58 and onto the scale platform 20 if necessary.

The hitch assembly 34 is provided at the first end 130 of the scale platform 20 and includes a tubular support member 154, a hitch extension member 156, and a hitch member 158. The tubular support member 154 is secured along the longitudinal axis of the platform by securing one end of the tubular support member 154 to the cross member 128b and extending the tubular support member 154 through, and securing the tubular support member 154 to, the cross member 128c and the end member 142. One end of the hitch extension member 156 is disposed in the tubular support member 154 in a telescoping relation and the other end is connected to the hitch member 158. The telescoping relation of the hitch extension member 156 and the tubular support 154 member allows the hitch member 156 to be moved to a retracted position when the weighing apparatus 10 is in use and moved to an extended position when the weighing apparatus 10 is being transported. The hitch extension member 156 is held in the extended position by a pin 160 extended through a hole in the tubular support member and a hole in the hitch extension member.

The scale pads 22a and 22b are laterally secured in the scale receiving recesses 60a and 60b by welding a plurality of foot pads 161 to the plate member 102. The scale pads 22c and 22d are similarly secured in the scale receiving recesses 60c and 60d of the second platform portion 28. The foot pads 161 are shaped and sized to receive and laterally hold the foot pads (not shown) of the scale pads 22a–22d.

As best shown in FIG. 5, the axle assembly 30 includes an axle 162 having a set of wheels 32a rotatingly supported on one end of the axle and another set of wheels 32b rotatingly supported on another end of the axle. The axle 162 is secured with a plurality of U-bolts 164 to an axle plate 166 extended between the first and second platform portions 26, 28. The width of the axle 162 is such that the set of wheels 32a and 32b are positioned in the wheel wells 120 of the first and second platform portions 26, 28, respectively.

Referring to FIGS. 6 and 7 in use the weighing apparatus 10 is first transported to the selected location. Next, the weighing apparatus 10 is set up so that the ground contact surface 56 of the scale platform 20 engages the ground support surface 12 and the load on the wheels 32 of the axle assembly 30 is removed to prevent the wheels 32 from being damaged due to the combined weight of the weighing apparatus 10, the vehicle 14 and the cargo disposed into the vehicle 14.

To remove the load from the wheels 32, the wheels 32 are suspended by providing a trench 168 (FIG. 7) in the ground support surface 12. The trench 168 is sized and shaped to accommodate the wheels 32 of the scale platform 20 such that the wheels 32 are suspended and thus do not carry the load of the scale platform 20 when the ground contact surface 56 of the scale platform 20 is engaged with the ground support surface 12. To suspend the wheels 32 and set the scale platform 20 on the ground support surface 12 such that the ground contact surface 56 of the scale platform 20 engages the ground support surface 12, the weighing apparatus 10 can simply be backed up until the wheels 32 are positioned in the trench 168.

With the wheels 32 suspended and the ground contact surface 56 engaging the ground support surface 12, the hitch extension member 156 is retracted and the ramp members 66 are moved to the lower position. Thereafter, the vehicle 14 can be backed onto the scale platform 20 and positioned on the scale pads 22a–22d disposed in the scale receiving recesses 60a–60d of the scale platform 20 (FIG. 1). After the vehicle is properly positioned on the scale pads 22a–22d, the vehicle 14 is loaded with a cargo. As the cargo is being loaded into the vehicle 14, the weight of the vehicle 14 and the cargo are continuously monitored by observing the display 94. When the display indicates that the vehicle 14 has been loaded to a predetermined weight, the process of loading the vehicle 14 with cargo is discontinued and the cargo is transported to a predetermined destination by the vehicle 14. Once the vehicle 14 has been removed from the weighing apparatus 10, another vehicle can be positioned on the weighing apparatus 10 and the process repeated.

FIGS. 8–10 illustrate another embodiment of an axle assembly 170 which allows the load to be removed from the platform wheels without the need for providing a trench. The axle assembly 170 comprises an axle tube 172, a first axle subassembly 174, and a second axle subassembly 176. The axle tube 172 has a first end 178 and a second end 180 and is disposed through the longitudinal support members 48 of the first and second platform portions 26 and 28, respectively, and secured thereto by welding the axle tube 172 to the longitudinal support members 48. The axle tube 172 is dimensioned such that the first and second ends 178 and 180 of the axle tube 172 extend beyond the first and second sides 134, 136 of the scale platform 20. As shown in FIG. 8, an opening 182 is provided in each of the longitudinal support members 50 to allow the axle tube 172 to extend therethrough.

As shown, the first axle subassembly 174 includes a sleeve portion 184 formed at one end, a hub assembly 185 adapted to be rotatably connected to a set of wheels 186 at another end, and an extension tube 188 disposed therebetween. The sleeve portion 184 of the first axle subassembly 174 is disposed about the first end 178 of the axle tube 172 in a slidable and rotatable relationship such that the first axle subassembly 174 is extendible along and rotatable about a horizontal axis 190 defined by the axle tube 172. The extension tube 188 extends substantially perpendicular from the axle tube 172 when the sleeve portion 184 is disposed about the axle tube 172, thereby offsetting the wheels 186 from the horizontal axis 190, as best shown in FIG. 9.

Similar to the first axle subassembly 174, the second axle subassembly 176 includes a sleeve portion 192 formed at one end, a hub assembly 194 adapted to be rotatably connected to a set of wheels 196 at another end, and an extension tube 198 disposed therebetween. The sleeve portion 192 of the second axle subassembly 176 is disposed about the second end 180 of the axle tube 172 in a slidable and rotatable relationship such that the second axle subassembly 176 is extendible along and rotatable about the horizontal axis 190 defined by the axle tube 172. The extension tube 198 extends substantially perpendicular from the axle tube 172 when the sleeve portion 192 is disposed about the axle tube 172, thereby offsetting the wheels 196 from the horizontal axis 190, as best shown in FIG. 9.

The first and second axle subassemblies 174, 176 are movable between a load bearing position (FIG. 8) wherein the first and second axle subassemblies 174, 176 are disposed about the first and second ends 178, 180 of the axle tube 172, respectively, and rotated so that the wheels 186, 196 rollingly support the scale platform 20, and a nonload bearing position (FIG. 10) wherein the first and second axle subassemblies 174,176 are extended outwardly along the horizontal axis 190 beyond the first and second sides 134, 136 of the scale platform 20 and revolved upwardly about the horizontal axis 190 such that the wheels 186 and 196 do not carry the load of the scale platform 20 when the ground contact surface 56 of the scale platform 20 is engaged with the ground support surface 12.

The first and second axle subassemblies 174, 176 are secured in the load bearing position with a pin 200 extended through a hole in the axle tube 172 and the sleeve portions 184, 192 of the first and second axle subassemblies 174 and 176, respectively. The first and second axle subassemblies 174 and 176 are each further supported in the load bearing position with a support block 202 extending from the scale platform 20. The support blocks 202 are positioned to supportingly engage a portion of the first and second axle subassemblies 174 and 176 preferably adjacent the hub assemblies 185, 184.

To move the first and second axle subassemblies 174, 176 to the nonload bearing position, the scale platform 20 is lifted at the first end 130 thereof with the scale platform 20 being supported on the ground support surface 12 at the second end 132 thereof until the wheels 186 and 196 are sufficiently suspended from the ground support surface 12. The scale platform 20 can be lifted with any suitable apparatus such as hydraulic jacks (not shown) which may be connected to the lower side of the platform or any other equipment or machinery capable of lifting the first end of the platform.

With the platform lifted, the pins 200 are removed from the first and second axle subassemblies 174 and 176, respectively, and the first and second axle subassemblies 174 and 176 are rotated downwardly as illustrated in FIG. 9 so that the wheels 186 and 196 clear the wheel wells 120. The first and second axle subassemblies 174 and 176 are then pulled outwardly until the first and second axle subassemblies 174 and 176 extend beyond the first and second sides 134 and 136 of the scale platform 20, respectively. The scale platform 20 is then lowered whereby the wheels 186, 196 will be caused to revolve upwardly about the horizontal axis 190 until the ground contact surface 56 of the scale platform 20 is fully engaged with the ground support surface 12. FIG. 10 illustrates the first axle subassembly 174 in the nonload bearing position with the ground contact surface 56 of the scale platform 20 engaged with the ground support surface 12.

To move the first and second axle subassemblies 174 and 176 back to the load bearing position, the scale platform 20 is lifted thereby causing the first and second axle subassemblies 174 and 176 to rotate downwardly. The first and second axle subassemblies 174 and 176 are then slid inwardly on the first and second ends 178 and 180 of the axle tube 172, respectively, rotated upwardly, and secured in position with the pins 200.

From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed:

1. An apparatus for weighing a vehicle on a ground support surface, comprising:

a scale platform adapted to support the vehicle, the platform having a first end, a second end, an upper side and a lower side, the lower side defining a ground contact surface engagable with the ground support surface, the ground contact surface having an area sufficient to support the platform and the vehicle on the ground support surface so as to prevent the platform from sinking substantially into the ground support surface when the platform is supporting a load; and a scale positioned on the upper side of the platform so as to be operably engagable with the vehicle to monitor the weight of the vehicle, wherein the platform is rollingly supported on a plurality of wheels and each of the wheels is connected to an axle assembly, the axle assembly comprising:

an axle tube having a first end and a second end, the axle tube being secured to the platform;

a first axle subassembly having a first end and a second end, the first end slidably and rotatably coupled to the first end of the axle tube so as to be extendible along and rotatable about a horizontal axis, the second end of the first axle subassembly being offset from the horizontal axis and rotatably connected to one of the wheels; and a second axle subassembly having a first end and a second end, the first end slidably and pivotally coupled to the second end of the axle tube so as to be extendible and rotatable about the horizontal axis, the second end of the second axle subassembly being offset from the horizontal axis and rotatably connected to the other wheel.

2. The apparatus of claim 1 wherein the platform further comprises:

hitch means secured to one end of the platform for connecting the platform to a towing vehicle such that the platform can be selectively transported.

3. The apparatus of claim 1 wherein the platform further comprises:

ramp means positioned at one end of the platform for moving the vehicle from the ground support surface to the upper side of the platform.

4. The apparatus of claim 3 wherein the ramp means comprises:

a pair of ramps pivotally connected to the first end of the platform so as to be movable between a raised position and a lowered position.

5. The apparatus of claim 1 wherein the platform is further defined as having a first side and a second side, and wherein the platform further comprises a first guide rail and a second guide rail, the first guide rail positioned on the first side of the platform and extending above the upper side of the platform, the second guide rail positioned on the second side of the platform parallel to the first guide rail and extending above the upper side of the platform.

6. The apparatus of claim 1 wherein the upper side of the platform has a scale receiving recess formed therein, and wherein the scale is positioned in the scale receiving recess.

7. The apparatus of claim 6 wherein the scale has an upper side, and wherein the upper side of the scale is substantially level with the upper side of the platform when the scale is positioned in the scale receiving recess of the platform.

8. An apparatus for weighing a vehicle on a ground support surface, the vehicle having a plurality of support wheels, the apparatus comprising:

a scale platform adapted to support the vehicle, the platform having a first end, a second end, an upper side and a lower side, the upper side having a plurality of scale receiving recesses formed therein and the lower side defining a ground contact surface engagable with the ground support surface, the ground contact surface having an area sufficient to support the platform and the vehicle on the ground support surface so as to prevent the platform from sinking substantially into the ground support surface when the vehicle is carrying a load in excess of 50,000 pounds; and a plurality of scales with one of the scales being positioned in each of the scale receiving recesses so as to be operably engagable with the wheels of the vehicle to monitor the weight of the vehicle, wherein the platform is rollingly supported on a plurality of wheels and each of the wheels is rollingly connected to an axle assembly, the axle assembly comprising:

an axle tube having a first end and a second end, the axle tube being secured to the platform;

a first axle subassembly having a first end and a second end, the first end telescopingly and rotatably coupled to the first end of the support member so as to be extendible along and rotatable about a horizontal axis, the second end of the first axle subassembly being offset from the horizontal axis and rotatably connected to one of the wheels; and a second axle subassembly having a first end and a second end, the first end slidably and pivotally coupled to the second end of the axle tube so as to be extendible and rotatable about the horizontal axis, the second end of the second axle subassembly being offset from the horizontal axis and rotatably connected to the other wheel.

* * * * *